(12) United States Patent
Kanai et al.

(10) Patent No.: US 11,233,915 B2
(45) Date of Patent: Jan. 25, 2022

(54) READING DEVICE, STAIN DISPLAY METHOD, AND DISPLAY DEVICE

(71) Applicant: SEIKO EPSON CORPORATION, Tokyo (JP)

(72) Inventors: Yuichi Kanai, Kitakyushu (JP); Yoshihiro Hamaguchi, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/001,963

(22) Filed: Aug. 25, 2020

(65) Prior Publication Data

US 2021/0067650 A1 Mar. 4, 2021

(30) Foreign Application Priority Data

Aug. 29, 2019 (JP) .............................. JP2019-156936

(51) Int. Cl.
*H04N 1/00* (2006.01)
*H04N 1/409* (2006.01)

(52) U.S. Cl.
CPC ..... *H04N 1/00814* (2013.01); *H04N 1/00602* (2013.01); *H04N 1/4097* (2013.01)

(58) Field of Classification Search
CPC .. H01M 4/0411; H01M 4/0483; H01M 4/139; Y02E 60/10; H04N 1/00602; H04N 1/00814; H04N 1/4097; H04N 1/00037; H04N 1/00376; H04N 1/00408; H04N 1/00702; H04N 1/00761; H04N 1/2032; H04N 1/2038; H04N 1/00002; H04N 1/00013; H04N 1/00045; H04N 1/00047; H04N 1/00063; H04N 1/00082; H04N 1/0009; H04N 1/0057; H04N 1/00572; H04N 1/00578; H04N 1/0058; H04N 1/0062; H04N 1/00631; H04N 1/00681; H04N 1/00689; H04N 1/00708; H04N 1/00734; H04N 1/00774; H04N 1/00779; H04N 1/00795; H04N 1/00909; H04N 1/00135; H04N 1/00167

(Continued)

(56) References Cited

U.S. PATENT DOCUMENTS 9,053,360 B2 * 6/2015 Kawamoto ............... G06T 5/00
9,699,342 B2 * 7/2017 Uchiyama ............ H04N 1/0057

(Continued)

FOREIGN PATENT DOCUMENTS

JP 2006-246335 9/2006

*Primary Examiner* — Negussie Worku
(74) *Attorney, Agent, or Firm* — Workman Nydegger

(57) ABSTRACT

A reading device includes a main body section, a cover configured to be opened and closed with respect to the main body section, a transport path constructed by the main body section and the cover, a roller that transports an original document, a glass plate arranged on the transport path, and a reading section that performs reading by receiving light through the glass plate, a display section, and a control section, and the control section causes the display section to display a device image in which a stain corresponding region corresponding to a position of the stain on the glass plate is specified in a glass plate image region expressing the glass plate, the device image being an image depicting the reading device in a state where the cover is opened and a configuration including a part of the transport path, the roller, and the glass plate is exposed.

9 Claims, 10 Drawing Sheets

(58) Field of Classification Search
USPC .......................................................... 358/474
See application file for complete search history.

(56) References Cited

U.S. PATENT DOCUMENTS

| | | | | |
|---|---|---|---|---|
| 2003/0058251 | A1* | 3/2003 | Nakayama | H04N 1/00002 |
| | | | | 345/589 |
| 2004/0246540 | A1* | 12/2004 | Makino | H04N 1/125 |
| | | | | 358/498 |
| 2005/0141051 | A1* | 6/2005 | Kashu | H04N 1/123 |
| | | | | 358/474 |
| 2010/0309530 | A1* | 12/2010 | Kamei | H04N 1/00734 |
| | | | | 358/474 |
| 2011/0149357 | A1* | 6/2011 | Utsunomiya | H04N 1/4097 |
| | | | | 358/475 |
| 2013/0136315 | A1* | 5/2013 | Kawamoto | G06K 9/00442 |
| | | | | 382/112 |
| 2015/0055157 | A1* | 2/2015 | Hamano | H04N 1/00689 |
| | | | | 358/1.12 |
| 2016/0248918 | A1* | 8/2016 | Yasaki | H04N 1/0032 |
| 2020/0036850 | A1* | 1/2020 | Hirayama | G06T 7/0008 |
| 2021/0133965 | A1* | 5/2021 | Kazayama | G01N 33/48 |

* cited by examiner

FIG. 8
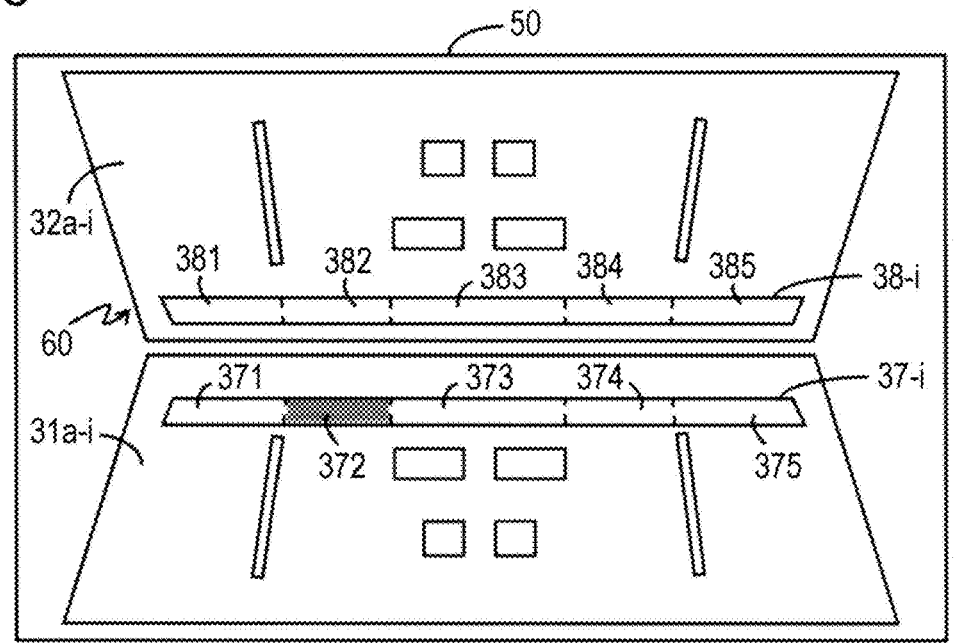
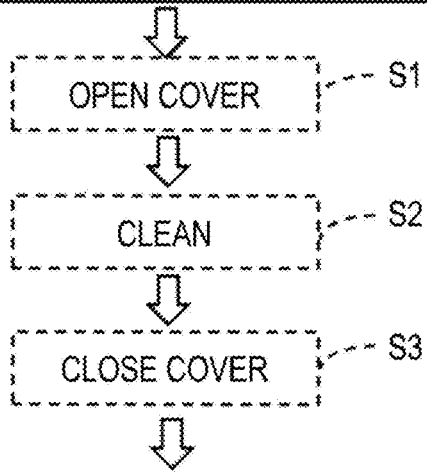
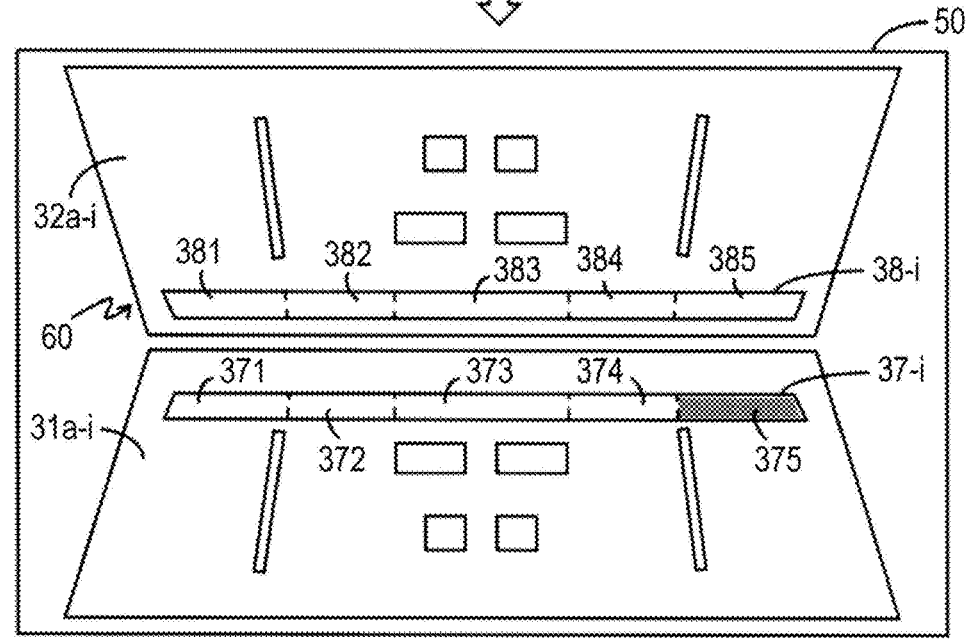

READING DEVICE, STAIN DISPLAY METHOD, AND DISPLAY DEVICE

The present application is based on, and claims priority from JP Application Serial Number 2019-156936, filed Aug. 29, 2019, the disclosure of which is hereby incorporated by reference herein its entirety.

BACKGROUND

1. Technical Field

The present disclosure relates to a reading device, a stain display method, and a display device.

2. Related Art

A technique for eliminating image noise generated due to dust attached to the reading glass is known (see JP-A-2006-246335). According to JP-A-2006-246335, the image reading device detects the position and size of dust by performing a dust detection processing subroutine. When the number of dust particles is larger than the predetermined number or the dust particles larger than the predetermined size are detected, it is determined that the dust particles are detected, and an operation panel performs notification that the dust particles are detected.

A user who receives a notification that a glass plate for reading which a scanner has is stained with dust or the like cleans the glass plate to remove the stain. However, in a notification in the related art, it was difficult to know which part of the glass plate was holding the stain, so a burden on the user to remove the stain on the glass plate was heavy.

SUMMARY

A reading device includes a main body section, a cover configured to be opened and closed with respect to the main body section, a transport path constructed by the main body section and the cover, a roller that transports an original document along the transport path, a glass plate arranged at a predetermined position on the transport path, a reading section that is provided to correspond to the glass plate and performs reading by receiving light through the glass plate, a display section, and a control section, and the control section performs stain detection processing for detecting a stain on the glass plate based on a reading result by the reading section, displays a device image in which a stain corresponding region corresponding to a position of the stain on the glass plate detected in the stain detection processing in a glass plate image region expressing the glass plate is indicated in a specific form different from a form of a region other than the stain corresponding region in the glass plate image region on the display section, the device image being an image depicting the reading device in a state where the cover is opened and a configuration including a part of the transport path, the roller, and the glass plate is exposed.

BRIEF DESCRIPTION OF THE DRAWINGS

FIG. 8 is a diagram showing an example in which a stain corresponding region in the device image changes according to a user's operation.

DESCRIPTION OF EXEMPLARY EMBODIMENTS

Hereinafter, embodiments of the present disclosure will be described with reference to the drawings. Each drawing is only an example for describing the present embodiment. Since each drawing is an example, a ratio and a shape may not be accurate, may not be matched with each other, or may be partially omitted.

1. Device Configuration

Figure 1:
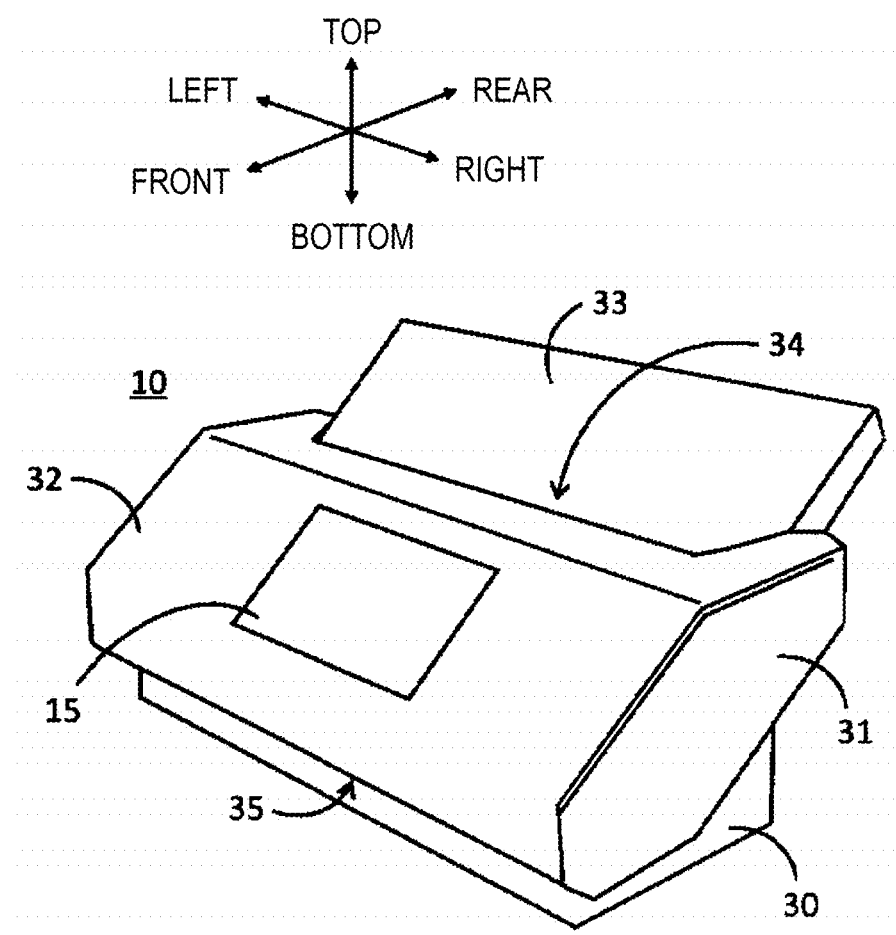
FIG. 1 is a perspective view showing an outer appearance of a reading device in a first posture.

FIG. 1 simply shows an outer appearance of a reading device 10 by a perspective view according to the present embodiment. The reading device 10 is a scanner that can read an original document which is printed. In the following, for convenience, the directions regarding the reading device 10 will be described using "Top", "Bottom", "Front", "Rear", "Right", and "Left" shown in FIG. 1 and the like.

Figure 3:
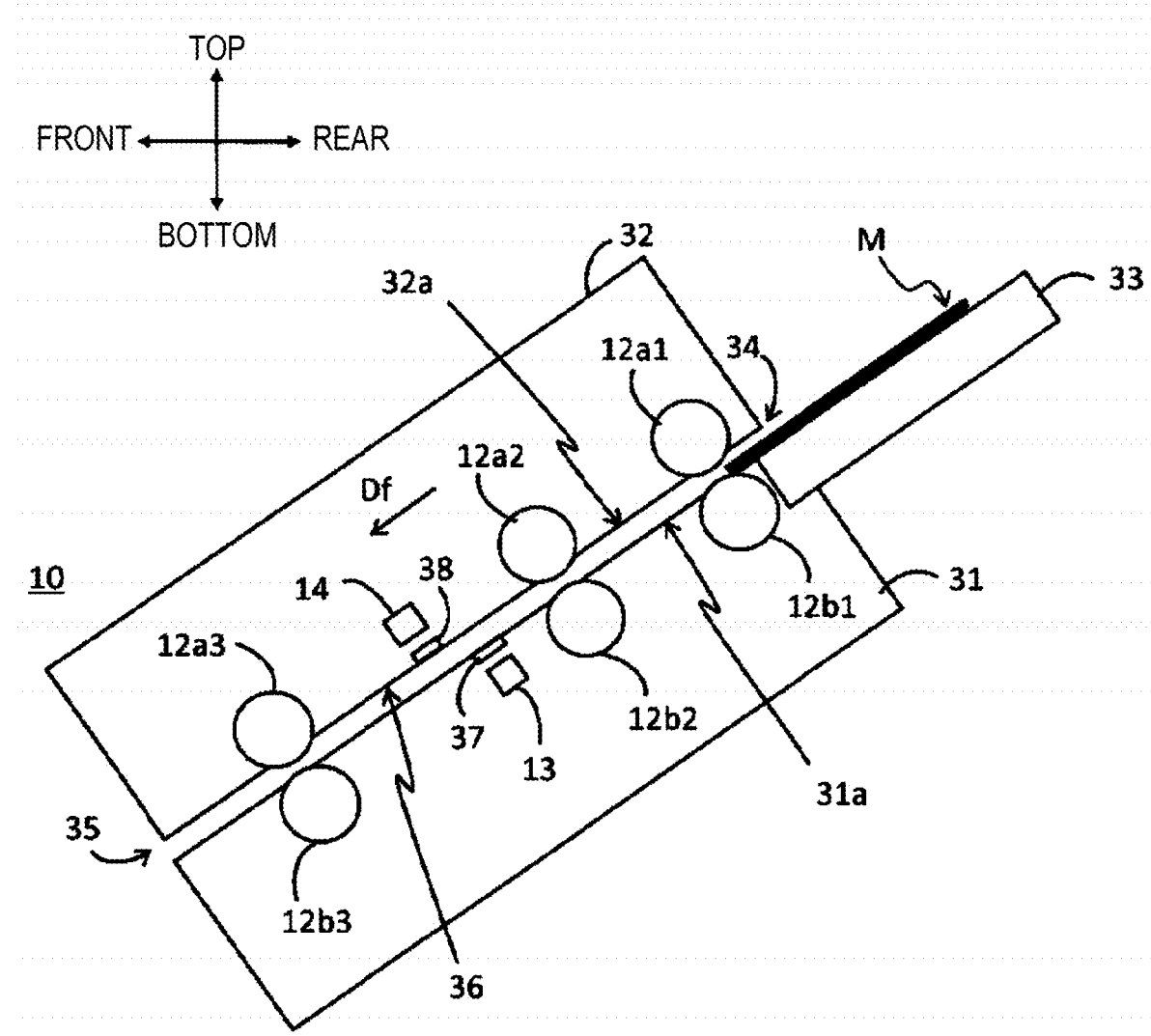
FIG. 3 is a diagram simply showing an internal structure of the reading device including a transport path from a viewpoint from the right.

The reading device 10 includes a main body section 31 and a cover 32 that can be opened and closed to the main body section 31. The main body section 31 and the cover 32 may be collectively referred to as a housing of the reading device 10. The main body section 31 is supported by a pedestal 30. As shown in FIG. 3 to be described later, a transport path 36 for the original document M is formed of the main body section 31 and the cover 32 inside the reading device 10.

A reference numeral 34 indicates a supply port 34 upstream of the transport path 36, and a reference numeral 35 indicates a discharge port 35 downstream of the transport path 36. An original document tray 33 is mounted to the main body section 31 behind the main body section 31. The original document M placed on the original document tray 33 is taken into the transport path 36 from the supply port 34, is transported downstream of the transport path 36, and is discharged from the discharge port 35 to the outside. According to FIGS. 1 and 3, the discharge port 35 is located ahead of the supply port 34. The cover 32 shown in FIGS. 1 and 3 is in a closed state. When a user manually opens the cover 32, the supply port 34 opens larger.

Figure 2:
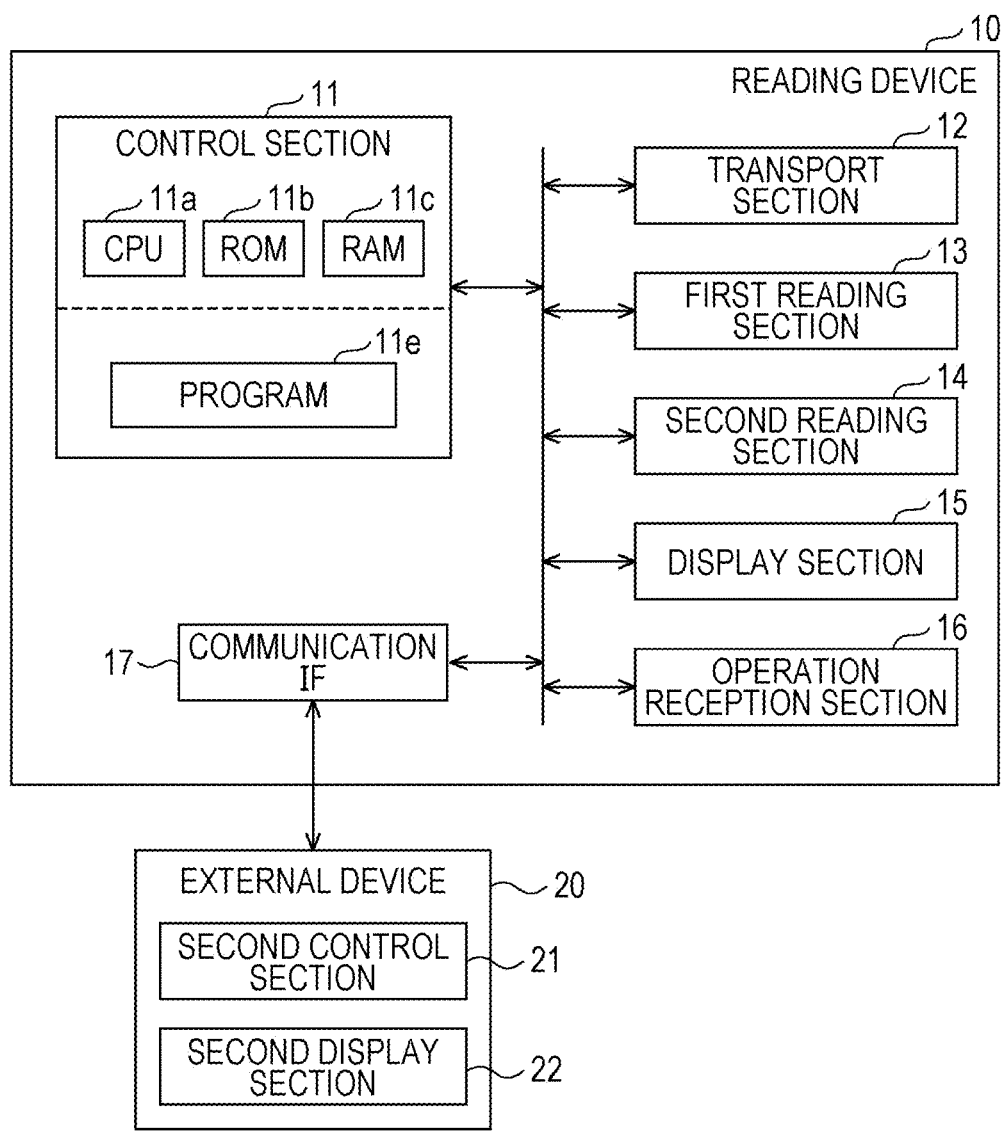
FIG. 2 is a block diagram showing a configuration of the reading device.

FIG. 2 simply shows a configuration of the reading device 10 by a block diagram. The reading device 10 includes a control section 11, a transport section 12, a first reading section 13, a second reading section 14, a display section 15, an operation reception section 16, and a communication interface 17. The interface is abbreviated as IF. The control section 11 includes, for example, a CPU 11a as a processor, memories such as ROM 11b and RAM 11c, and other storage means, and controls each section of the reading device 10 according to a program 11e stored in the memory. The processor that configures the control section 11 is not limited to one CPU, may be a configuration that performs processing by a plurality of CPUs or a hardware circuit such as an application specific integrated circuit (ASIC), and may be a configuration in which the CPU and the hardware circuit cooperate to perform processing.

The transport section 12 transports the original document M from upstream to downstream of the transport path 36 under control of the control section 11. A direction from the upstream to the downstream of the transport path 36 may be referred to as a transport direction. The upstream and downstream of the transport path 36 are also simply referred to as upstream and downstream. The original document M is typically a paper medium, but may be a sheet-like medium made of a material other than paper. The transport section 12 includes a plurality of rollers that transports the original document M, a motor that gives power to the rollers to rotate the rollers, and the like.

The first reading section 13 and the second reading section 14 are mechanisms for optically reading the original document M under the control of the control section 11. Each of the first reading section 13 and the second reading section 14 includes a light source for irradiating the original document M, an image sensor for receiving reflected light from the original document M and outputting a charge according to the amount of received light, an optical system for guiding the light to the image sensor, and the like. The image sensor of each of the first reading section 13 and the second reading section 14 is a line sensor in which a plurality of photoelectric conversion elements are arranged in a direction intersecting the transport direction. The direction intersecting the transport direction is the left-right direction.

The first reading section 13 is a reading section for reading one side of the original document M transported by the transport section 12, and the second reading section 14 is a reading section for reading the other side of the original document M transported by the transport section 12. Therefore, the reading device 10 corresponds to a sheet feed scanner capable of simultaneously reading both sides of the original document. At least a part of the transport section 12 may be referred to as an automatic paper feeder or an auto document feeder (ADF).

The display section 15 is a unit for displaying visual information, and is configured with, for example, a liquid crystal display or an organic EL display. In an example of FIG. 1, the display section 15 is provided on a surface of the cover 32 that faces the front. The operation reception section 16 is a unit for receiving an operation from the user, and is, for example, a physical button or a touch panel. Although not shown in particular, the operation reception section 16 is provided at a position where a housing user can easily operate. The touch panel may be realized as one function of the display section 15.

The communication IF 17 is a general term for one or a plurality of IFs for the reading device 10 to perform wired or wireless communication with the outside in accordance with a predetermined communication protocol including a known communication standard. In an example of FIG. 2, the reading device 10 is communicatively connected to an external device 20 through the communication IF 17. The reading device 10 may be a multifunction peripheral having a plurality of functions such as a printing function, a facsimile communication function, an electronic mail communication function in addition to the function as a scanner.

The external device 20 is, for example, a personal computer (PC), a server, a smartphone, a tablet type terminal, or the like. In FIG. 2, the configuration of the external device 20 is also simply shown, and the external device 20 includes a second control section 21 for controlling the external device 20 and a second display section 22 for displaying visual information.

FIG. 3 simply shows an internal structure of the reading device 10 including the transport path 36 from a viewpoint from the right. As shown in FIG. 3, the transport path 36 is a gap secured between a main body section upper surface 31a that faces upward of the main body section 31 and a cover lower surface 32a that faces downward of the cover 32. Such a transport path 36 is formed of the main body section upper surface 31a, the cover lower surface 32a, and the rollers 12a1, 12a2, 12a3, 12b1, 12b2, 12b3. A reference numeral Df indicates a transport direction Df. The original document tray 33 extends further upstream than the supply port 34, and the surface continuous with the main body section upper surface 31a is formed upstream than the main body section upper surface 31a.

FIG. 3 shows some pairs of rollers facing each other across the transport path 36 as rollers constituting a part of the transport section 12. A pair of rollers consisting of the rollers 12a1 and 12b1 are referred to as a first pair of rollers 12a1, 12b1. A pair of rollers consisting of the rollers 12a2 and 12b2 are referred to as a second pair of rollers 12a2, 12b2. A pair of rollers consisting of the rollers 12a3 and 12b3 are referred to as a third pair of rollers 12a3, 12b3. The rollers 12a1, 12a2, 12a3 are arranged in the cover 32, and the rollers 12b1, 12b2, 12b3 are arranged in the main body section 31. Each pair of rollers transports the original document M by pinching the original document M between the rollers constituting the pair and rotating the original document M.

The first pair of rollers 12a1, 12b1 in the most upstream among the roller pairs shown in FIG. 3 is arranged at a position slightly downstream of the supply port 34. The first pair of rollers 12a1, 12b1 takes one original document M out of the original documents M placed on the original document tray 33 into the transport path 36 and transports the original document M downstream.

The second pair of rollers 12a2, 12b2 located downstream of the first pair of rollers 12a1, 12b1 and upstream of the reading sections 13, 14 further transport the original document M transported by the first pair of rollers 12a1, 12b1 to the downstream. When the original document M transported by the second pair of rollers 12a2, 12b2 passes through the positions of the first reading section 13 and the second reading section 14 in the transport path 36, the original document M is read by the first reading section 13 and the second reading section 14. The third pair of rollers 12a3, 12b3 located the most downstream among the roller pairs shown in FIG. 3 is arranged more downstream than the reading sections 13 and 14. The third pair of rollers 12a3, 12b3 further transports the original document M transported by the second pair of rollers 12a2, 12b2 to the downstream, and discharges the original document M from the discharge port 35 to the outside.

In an example of FIG. 3, the first reading section 13 is arranged in the main body section 31. A transparent first glass plate 37 is arranged on the main body section upper surface 31a, corresponding to the first reading section 13. The first glass plate 37 is exposed to the transport path 36, and the first reading section 13 reads the light in the transport path 36 by receiving the light through the first glass plate 37. The first reading section 13 reads a surface facing the main body section upper surface 31a among both surfaces of the original document M transported through the transport path 36.

In the example of FIG. 3, the second reading section 14 is arranged in the cover 32. A transparent second glass plate 38 is arranged on the cover lower surface 32a, corresponding to the second reading section 14. The second glass plate 38 is exposed to the transport path 36, and the second reading section 14 reads the light in the transport path 36 by receiving the light through the second glass plate 38. The second reading section 14 reads a surface facing the cover lower surface 32a among both surfaces of the original document M transported through the transport path 36.

The line sensors included in the first reading section 13 and the second reading section 14 respectively have the left-right direction intersecting the transport direction Df as a longitudinal direction. In FIG. 3, the direction perpendicular to the drawing is the left-right direction. Therefore, the first glass plate 37 and the second glass plate 38 also correspond to the lengths of the line sensor of the first reading section 13 and the line sensor of the second reading section 14 respectively, and have a long shape in the left-right direction.

2. Stain Detection Notification Processing

Figure 4:
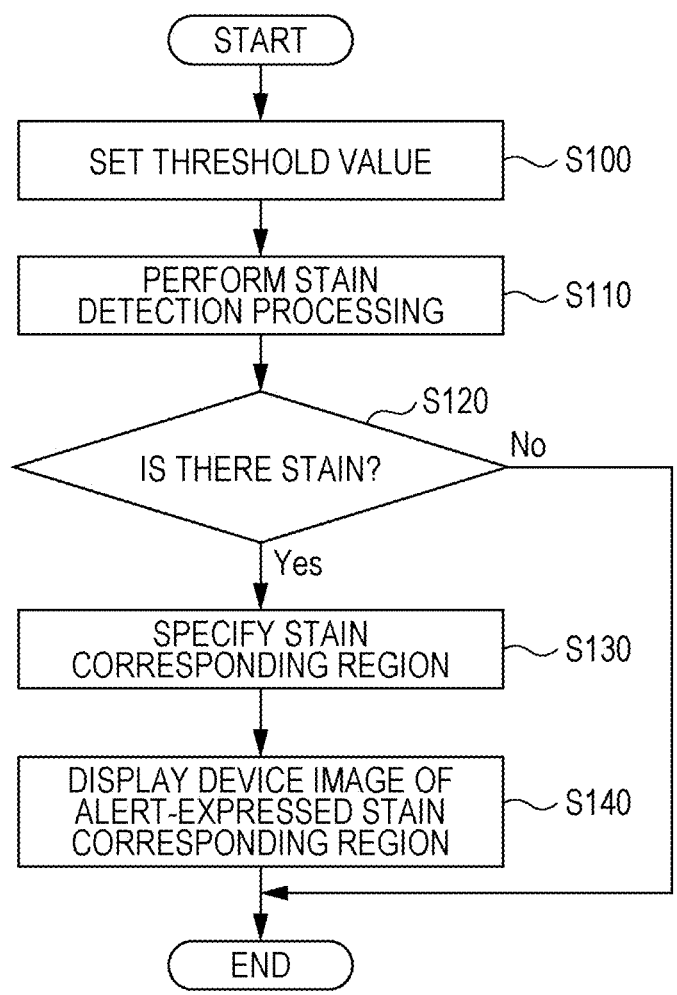
FIG. 4 is a flowchart showing stain detection notification processing.

FIG. 4 is a flowchart showing stain detection notification processing performed by the control section 11 according to the program 11e.

The control section 11 starts the stain detection notification processing when conditions for starting the stain detection notification processing are satisfied. The condition for starting the stain detection notification processing is, for example, that the reading device 10 is powered on. That is, when the power button not shown in the figure included in the reading device 10 is pressed to turn on the power, the control section 11 can start the stain detection notification processing.

Further, the condition for starting the stain detection notification processing is, for example, that a reading of the original document by the reading sections 13 and 14 is completed. That is, the control section 11 can start the stain detection notification processing at the timing when the reading and discharging of all the original documents placed on the original document tray 33 are completed.

Further, the condition for starting the stain detection notification processing is, for example, that the cover 32 is closed. That is, the control section 11 can start the stain detection notification processing when it is determined that the cover 32 is closed based on a detection signal from a sensor not shown in the figure for detecting an opening/closing of the cover 32.

In step S100, the control section 11 sets a threshold value for stain detection processing in step S110. The threshold value for the stain detection processing includes a first threshold value for determining whether the glass plate is stained by comparing with the output of the line sensor, a second threshold value used for collectively regarding discontinuous stains as one stain, and the like. Each threshold value is stored in a predetermined memory in advance, and the control section 11 sets each stored threshold value for use in step S110. The setting of each threshold value can be freely changed by a user's operation.

In step S110, the control section 11 performs the stain detection processing using each set threshold value. Step S110 corresponds to a stain detection step. The stain detection processing will be briefly described. The control section 11 causes the first reading section 13 to perform reading in a state where the original document M does not exist in the transport path 36. The first reading section 13 causes the light source to emit light and outputs an electric signal read by the line sensor to the control section 11. The control section 11 compares a gradation of brightness indicated by the electric signal output from each photoelectric conversion element of the line sensor of the first reading section 13 with the first threshold value, and determines that a position on the first glass plate 37 where the gradation of brightness is lower than the first threshold value is "stain".

The positions on the first glass plate 37 and the second glass plate 38 are specified by the coordinate position in the left-right direction of each photoelectric conversion element constituting the line sensor of the first reading section 13 and the second reading section 14. The control section 11 collectively detects, as one stain, a range in which the positions determined as stains in the coordinate units of the photoelectric conversion elements are continuous in the left-right direction. However, even if the stains are discontinuous, the control section 11 collectively regards the stains that fall within the range of the second threshold value, which is a predetermined distance in the left-right direction, as one stain.

The control section 11 detects the number and position of stains on the first glass plate 37 in such stain detection processing. The control section 11 causes the second reading section 14 to perform reading as well as the first reading section 13 to detect the number and position of stains on the second glass plate 38.

In step S120, the control section 11 branches processing depending on whether the stain can be detected in the stain detection processing in step S110. That is, when the control section 11 detects one or more stains on at least one of the first glass plate 37 and the second glass plate 38 in the stain detection processing, the control section 11 proceeds from a determination of "Yes" to step S130. On the other hand, when the stain on the first glass plate 37 and the stain on the second glass plate 38 cannot be detected in the stain detection processing, the control section 11 makes a determination of "No". The flowchart of the stain detection notification processing ends.

In step S130, the control section 11 specifies a "stain corresponding region" in a glass plate image region in a "device image" displayed on the display section 15 in step S140 according to the result of the stain detection processing in step S110.

Here, the device image will be described first.

Figure 5:
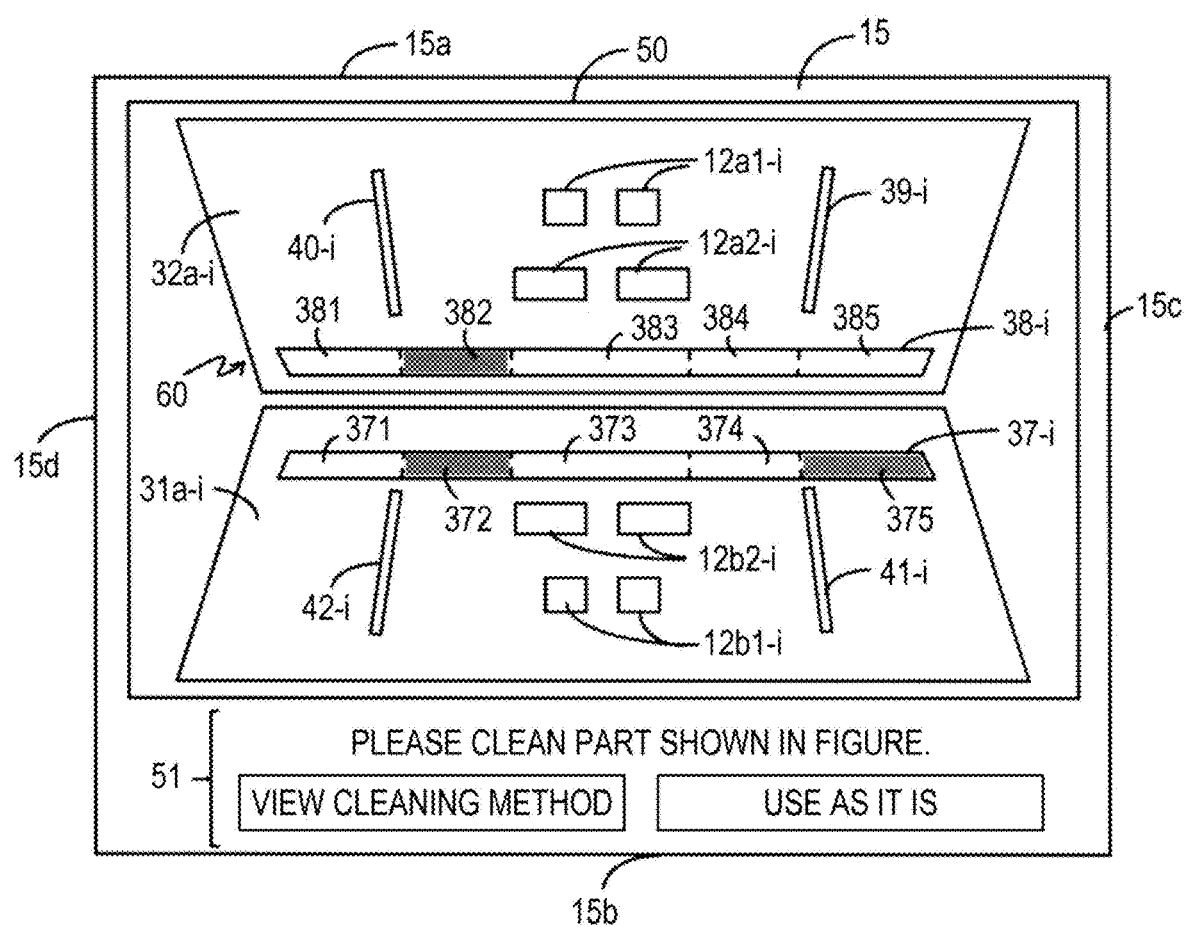
FIG. 5 is a diagram showing a first example of a device image displayed on a display section.

FIG. 5 shows a first example of a device image 60 displayed on the display section 15. The device image 60 is an image depicting the internal structure of the reading device 10 in a state where the cover 32 is opened from a viewpoint facing the downstream from the supply port 34, and the internal structure of the reading device 10 is almost faithfully expressed. More specifically, the device image 60 is an image depicting the reading device 10 in a state where the cover 32 is opened and the configuration including the part of the transport path 36, the rollers 12a1, 12a2, 12b1 and 12b2, the first glass plate 37 and the second glass plate 38 is exposed. In an example of FIG. 5, a portion of the transport path 36 downstream of the glass plates 37 and 38 is not depicted in the device image 60.

Among the regions in the display section 15, a region displaying the device image 60 is referred to as a first display region 50. A reference numeral 15a indicates an upstream side 15a which is an upstream side among four sides of the display section 15, and a reference numeral 15b indicates a downstream side 15b which is a downstream side among the four sides. A reference numeral 15c indicates a right side 15c which is a right side among the four sides, and a reference numeral 15d indicates a left side 15d which is a left side among the four sides.

A reference numeral with "-i" added at the end in FIG. 5 indicates a region in which each component of the reading device 10 is expressed by an image. For example, a reference numeral 31a-i is a part of the device image 60 and indicates a main body section upper surface image region 31a-i expressing a part of the main body section upper surface 31a. A reference numeral 32a-i is a cover lower surface image region 32a-i expressing a part of the cover lower surface 32a. Similarly, a reference numeral 37-i is a first glass plate image region 37-i expressing the first glass plate 37, and a reference numeral 38-i is a second glass plate image region 38-i expressing the second glass plate 38. Each of the glass plate image regions 37-i and 38-i corresponds to the glass plate image region. The reference numerals in the display section 15 are indicated for convenience only, and are not actually displayed in the display section 15.

Although not particularly shown in FIG. 3, the main body section upper surface 31a and the cover lower surface 32a have ribs that are long protrusions along the transport direction Df at positions on the right and left of the rollers 12b1, 12b2, 12a1, 12a2. Such ribs serve to reduce a contact area between the original document M and the main body section upper surface 31a or the cover lower surface 32a and to smoothly transport the original document M. A reference numerals 41-i and 42-i are rib image regions 41-i and 42-i expressing each rib formed on the main body section upper surface 31a. Similarly, a reference numerals 39-i and 40-i are rib image regions 39-i and 40-i expressing each rib formed on the cover lower surface 32a.

The device image 60 is an image depicted from a viewpoint facing the downstream from the upstream. Therefore, the left and right of the device image 60 itself are in an opposite relationship to the left and right of the reading device 10. Here, the device image 60 will be described based on the left and right of the reading device 10. Therefore, a rib image region 41-i is an image expressing a rib formed on the left of the rollers 12b1 and 12b2 on the main body section upper surface 31a, and a rib image region 42-i is an image expressing a rib formed on the right of the rollers 12b1 and 12b2. Similarly, a rib image region 39-i is an image expressing a rib formed on the left of the rollers 12a1 and 12a2 on the cover lower surface 32a, and a rib image region 40-i is an image expressing a rib formed on the right of the rollers 12a1 and 12a2.

Reference numerals 371, 372, 373, 374, 375 are a plurality of regions in the first glass plate image region 37-i, and are divided regions 371, 372, 373, 374, 375 when the first glass plate image region 37-i is divided in a first direction which intersects with the transport direction by the roller. The first direction corresponds to the left-right direction of the reading device 10, and corresponds to the longitudinal direction of the first glass plate image region 37-i and the second glass plate image region 38-i in the device image 60. Similarly, reference numerals 381, 382, 383, 384, 385 are a plurality of regions in the second glass plate image region 38-i, and are divided regions 381, 382, 383, 384, 385 when the second glass plate image region 38-i is divided in a first direction.

In FIG. 5, broken lines dividing the divided regions 371, 372, 373, 374, 375 in the first glass plate image region 37-i and broken lines dividing the divided regions 381, 382, 383, 384, 385 in the second glass plate image region 38-i are shown for easy understanding. However, these broken lines may not actually be displayed in the display section 15. These divided regions may be regions obtained by equally dividing the glass plate image regions 37-i and 38-i along the longitudinal direction thereof. However, in the example of the figure, these divided regions are regions divided based on positions of peripheral components in the reading device 10.

For example, a central divided region 373 in the first glass plate image region 37-i and a central divided region 383 in the second glass plate image region 38-i are a range from one end to the other end of a range where roller image regions 12a1-i, 12a2-i, 12b1-i, 12b2-i exist within a range of the glass plate image regions 37-i, 38-i in the longitudinal direction. Further, a boundary between a divided region 374 and a divided region 375 in the first glass plate image region 37-i and a boundary between a divided region 384 and a divided region 385 in the second glass plate image region 38-i correspond to positions of the rib image regions 41-i and 39-i. Similarly, a boundary between a divided region 371 and a divided region 372 in the first glass plate image region 37-i and a boundary between a divided region 381 and a divided region 382 in the second glass plate image region 38-i correspond to positions of the rib image regions 42-i and 40-i.

The control section 11 stores in advance settings of the divided regions 371, 372, 373, 374, 375 in such the first glass plate image region 37-i. Similarly, the control section 11 stores in advance settings of the divided regions 381, 382, 383, 384, 385 in such the second glass plate image region 38-i. Further, the control section 11 also recognizes in advance a correspondence relation between a position in the first glass plate 37 and a position in the first glass plate image region 37-i, and a correspondence relation between a position in the second glass plate 38 and a position in the second glass plate image region 38-i.

In this situation, in step S130, the control section 11 specifies a divided region corresponding to a stain position of the first glass plate 37 detected in step S110 among the divided regions 371, 372, 373, 374, 375 of the first glass plate image region 37-i as a stain corresponding region. Similarly, the control section 11 specifies a divided region corresponding to a stain position of the second glass plate 38 detected in step S110 among the divided regions 381, 382, 383, 384, 385 of the second glass plate image region 38-i as a stain corresponding region. In step S130, one or more stain corresponding regions are specified in at least one of the first glass plate image region 37-i and the second glass plate image region 38-i.

In step S140, the control section 11 displays the device image 60 expressing the stain corresponding region specified in step S130 is displayed in a specific form different from that of a divided region other than the stain corresponding region on the display section 15. Step S140 corresponds to a display step. An expression in the specific form is called an alert expression. The alert expression is, for example, an expression to change colors and brightness compared with other regions. Alternatively, the control section 11 may display the stain corresponding region by blinking or superimposing a specific mark or icon on the stain corresponding region as the alert expression.

In the example of FIG. 5, the device image 60 is displayed on the display section 15 in which the divided regions 372 and 375 of the first glass plate image region 37-i are painted grey to be alert-expressed as the stain corresponding region, and the divided region 382 of the second glass plate image region 38-i is similarly alert-expressed as the stain corresponding region. The user who visually recognizes the device image 60 displayed in this manner can concretely and accurately know which part of the glass plates 37 and 38 is stained based on the positional relation with each configuration such as rollers and ribs around the glass plates 37 and 38.

Among the regions in the display section 15, a region including a predetermined character string, which is different from the first display region 50, is referred to as a second display region 51. As shown in FIG. 5, for example, a message such as "Please clean the part shown in figure." and menu items such as "view cleaning method" and "use as it is" are displayed in the second display region 51. The control section 11 displays a detailed cleaning method of the glass plate in a still image or a moving image on the display section 15 when "view cleaning method" is selected by the user. When "use as it is" is selected by the user, the control section 11 closes, for example, the first display region 50 and returns the display on the display section 15 to a predetermined home screen. When the display of the device image 60 ends, the flowchart of the stain detection notification processing ends.

Figure 6:
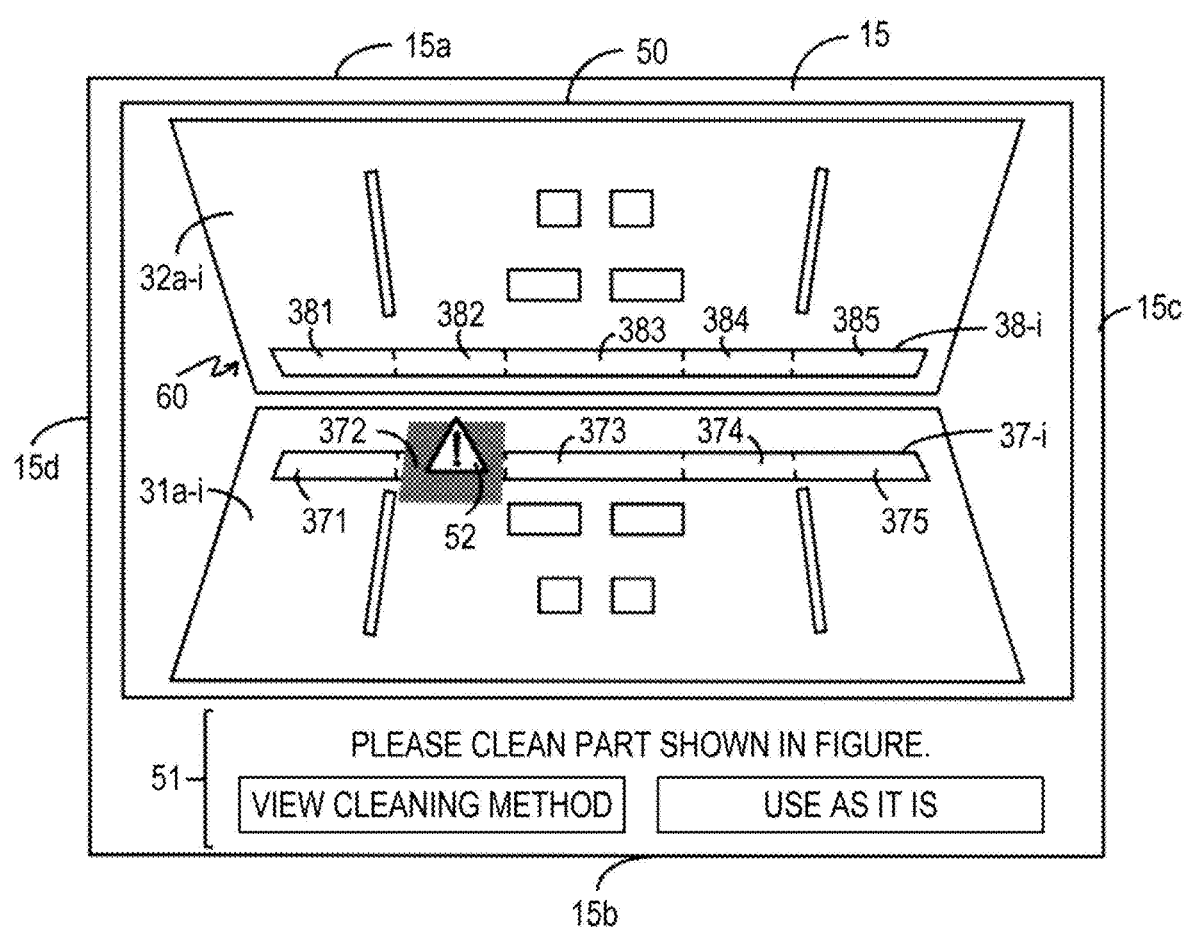
FIG. 6 is a diagram showing a second example of the device image displayed on the display section.

FIG. 6 shows a second example of a device image 60 displayed on the display section 15. In the following, matters that are common to the description up to now will be omitted. Further, in FIGS. 6, 7, 8, 10A, and 10B, the reference numeral of the device image 60 is appropriately omitted in consideration of visibility.

In step S140, the control section 11 may collectively alert express the stain corresponding region and a predetermined region outside the glass plate image region adjacent to the stain corresponding region in the device image 60. As shown in FIG. 6, the divided region 372 of the first glass plate image region 37-$i$ is a stain corresponding region, and the divided region 372 is alert-expressed. A predetermined range of region outside the first glass plate image region 37-$i$ adjacent to the divided region 372 is also alert-expressed together with the divided region 372.

Further, in an example of FIG. 6, a warning icon 52 is displayed in a superimposed manner on the divided region 372 specified as the stain corresponding region.

Figure 7:
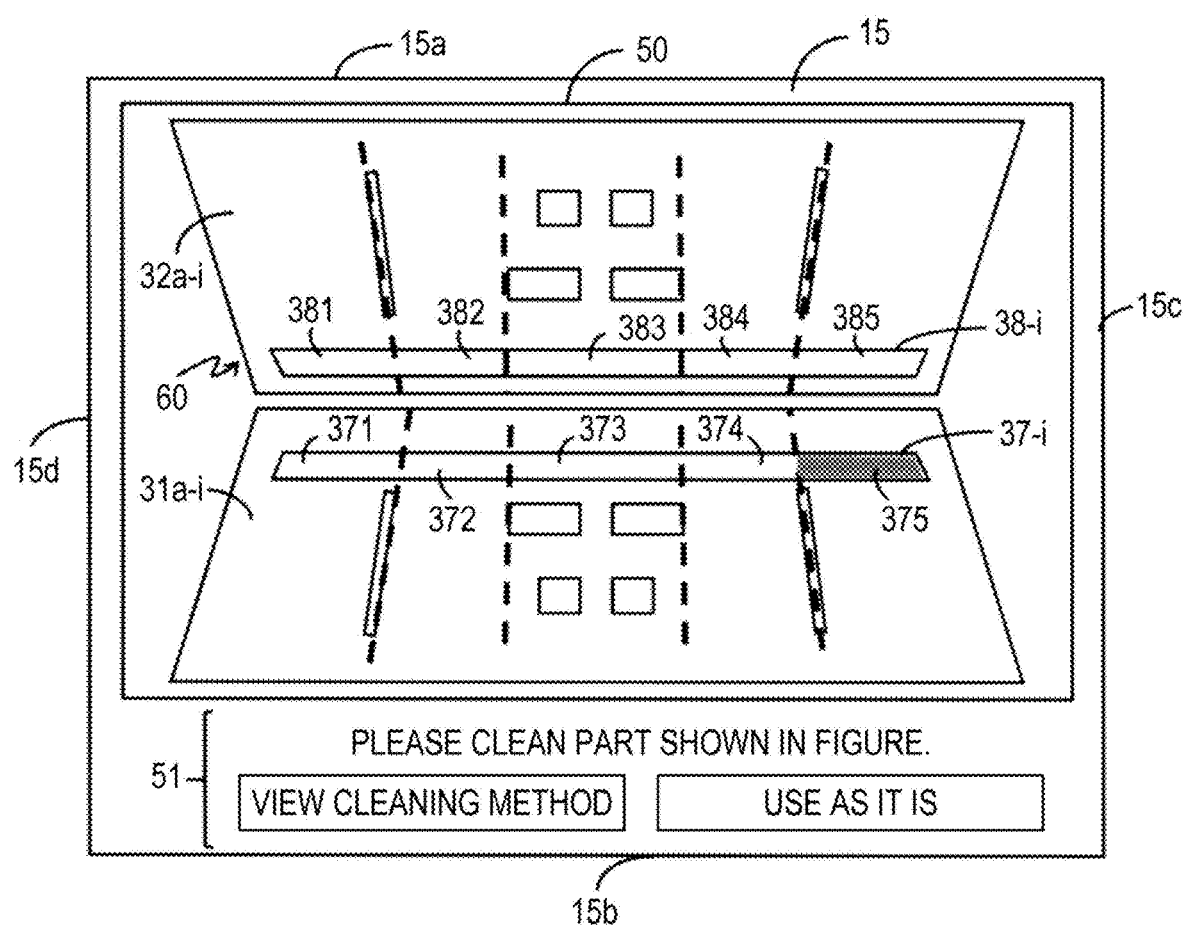
FIG. 7 is a diagram showing a third example of the device image displayed on the display section.

FIG. 7 shows a third example of a device image 60 displayed on the display section 15.

In step S140, the control section 11 may display a plurality of division lines that divide the glass plate image region into a plurality of divided regions in the device image 60. A thick broken line shown in FIG. 7 is the division line. In an example of FIG. 7, the division lines are extended so as to protrude outside the first glass plate image region 37-$i$ and the second glass plate image region 38-$i$, and displayed over the main body section upper surface image region 31$a$-$i$ and the cover lower surface image region 32$a$-$i$.

FIG. 8 exemplifies how the stain corresponding region in the device image 60 changes according to the user's operation. At an upper stage and a lower stage in FIG. 8, the first display region 50 including the device image 60 in the display section 15 is extracted and described. Further, in FIG. 8, the user's operation is described as steps S1, S2, and S3.

It is assumed that the control section 11 starts the stain detection notification processing of FIG. 4 at a certain timing, and displays a first device image 60 (steps S130 and S140) on the display section 15 according to the result of the first stain detection processing (step S110). The device image 60 shown at the upper stage in FIG. 8 is an example of the first device image 60. The user who visually recognizes the first device image 60 actually opens the cover 32 (step S1), cleans the position of the first glass plate 37 corresponding to the divided region 372 which is alert-expressed in the first device image 60 (step S2), and closes the cover 32 (step S3).

In response to the cover 32 being closed, the control section 11 starts the stain detection notification processing of FIG. 4 again, and displays a second device image 60 (steps S130 and S140) on the display section 15 according to a result of a second stain detection processing (step S110). The device image 60 shown at the lower stage in FIG. 8 is an example of the second device image 60. As a result of the user cleaning the glass plate with a cloth or the like, the stain that was previously attached to the glass plate may move to another position of the glass plate. In the second device image 60, not the divided region 372 but the divided region 375 is alert-expressed due to such movement of the stain. That is, when the position of the stain on the glass plate detected by the second stain detection processing is different from the position of the stain on the glass plate detected by the first stain detection processing, as a result, the control section 11 displays the second device image 60 in which the position of the stain corresponding region is changed from the first device image 60 on the display section 15.

Figure 9:
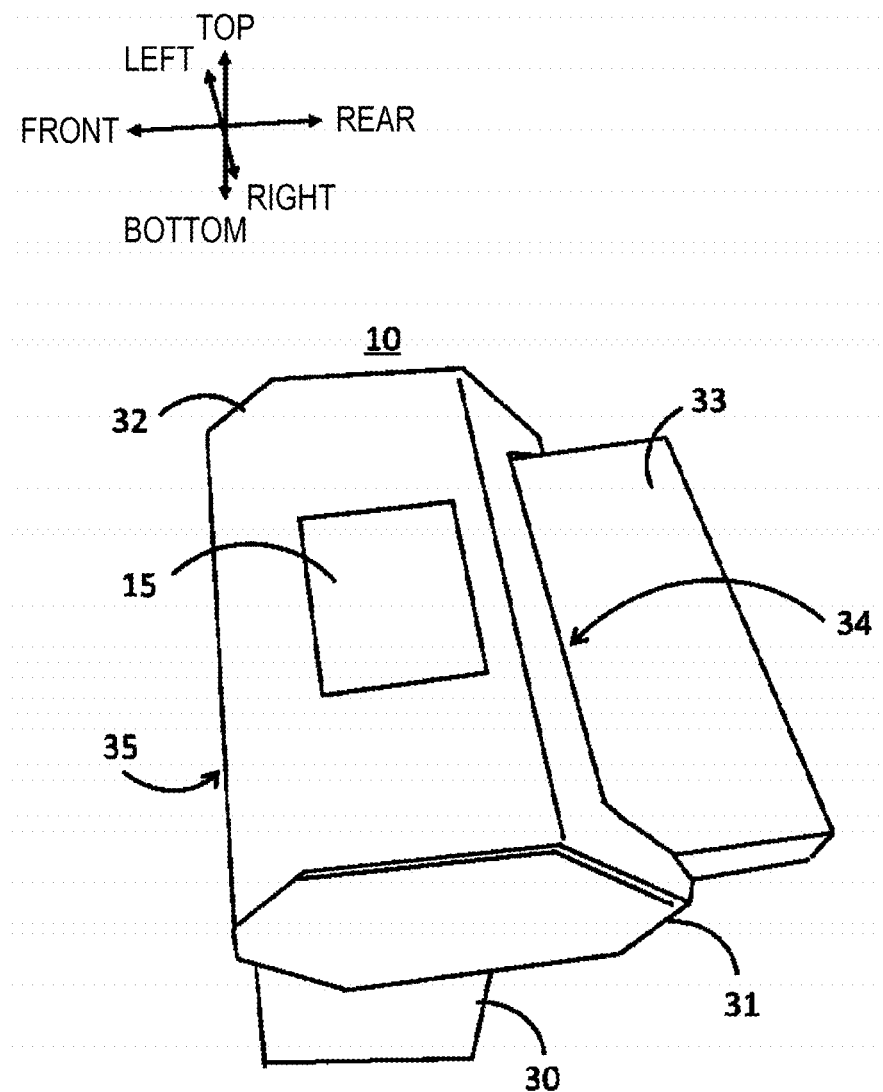
FIG. 9 is a perspective view showing an outer appearance of the reading device in a second posture.

FIG. 9 simply shows the outer appearance of the reading device 10 by a perspective view. In FIG. 1 and FIG. 9, a posture of the housing of the reading device 10 is different. The reading device 10 shown in FIG. 1 is in a state where the housing stands upright to the pedestal 30 to some extent. The posture of the reading device 10 shown in FIG. 1 is referred to as a first posture. When viewed from the user standing in front of the reading device 10, the display section 15 of the reading device 10 in the first posture stands up at an angle that is easy to visually recognize. Therefore, the first posture is a suitable posture of the reading device 10 when the user standing in front of the reading device 10 operates. FIG. 3 is also a diagram assuming that the reading device 10 is in the first posture.

On the other hand, in the reading device 10 shown in FIG. 9, the housing is in a lying posture rather than the first posture, and a surface of the cover 32 having the display section 15 and a surface of the original document tray 33 are horizontal or substantially horizontal. The posture of the reading device 10 shown in FIG. 9 is referred to as a second posture. The user can feed the original document M from a paper feeding port 34 with user's right hand and take up the original document M discharged from the discharge port 35 with a left hand while facing the reading device 10 from the right of the reading device 10 in the second posture. Further, the user can feed the original document M from the paper feeding port 34 with user's left hand and take up the original document M discharged from the discharge port 35 with the right hand while facing the reading device 10 from the left of the reading device 10 in the second posture. That is, the second posture is a suitable posture of the reading device 10 when the user standing on the right or left side of the reading device 10 operates.

The user can freely change the posture of the reading device 10 to the first posture or the second posture. The control section 11 detects the posture of the reading device 10 according to an output from a posture detecting sensor not shown in the figure. Then, the control section 11 changes the display on the display section 15 according to the change in the posture of the reading device 10. At this time, the control section 11 maintains the orientation of the first display region 50 with respect to the display section 15 regardless of the change of the posture of the reading device 10, and changes the orientation of the second display region 51 with respect to the display section 15 according to the change of the posture of the reading device 10.

Figure 10A:
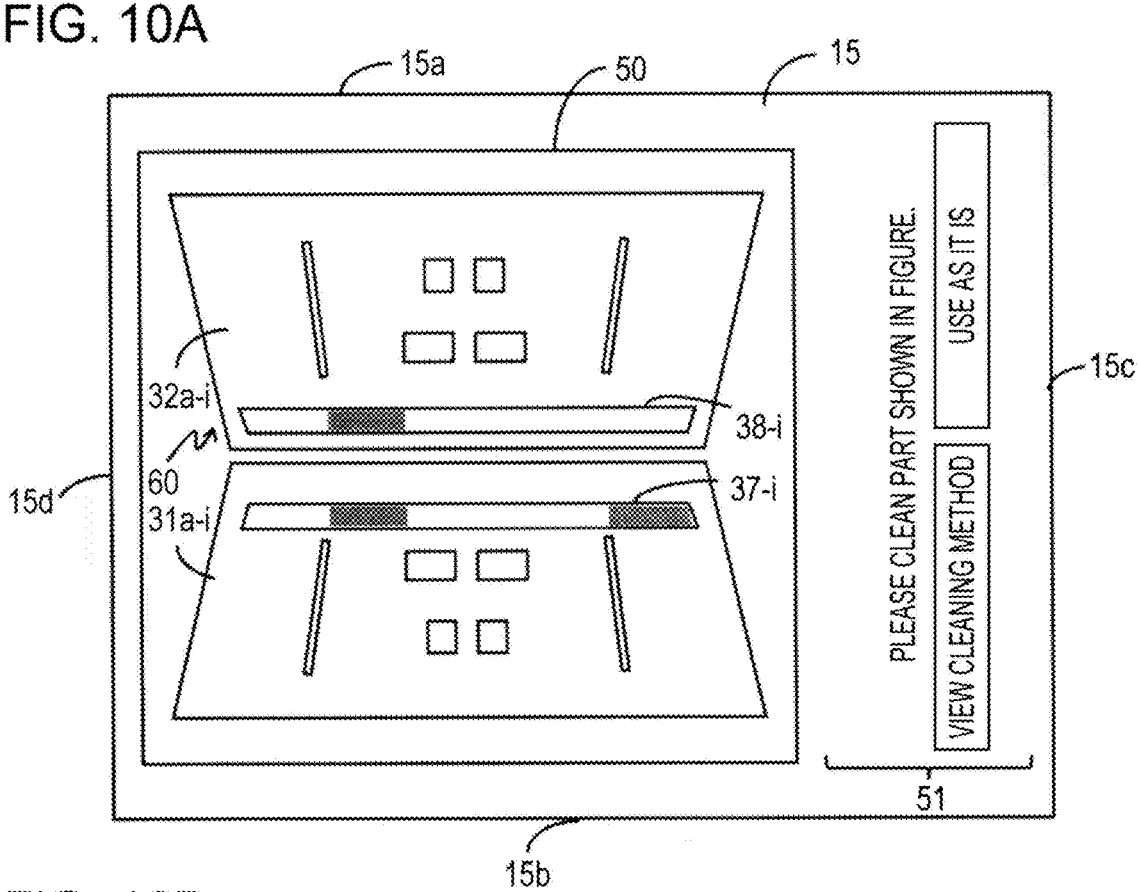
FIG. 10A is a diagram showing a display of a display section that corresponds to a right position use mode.
Figure 10B:
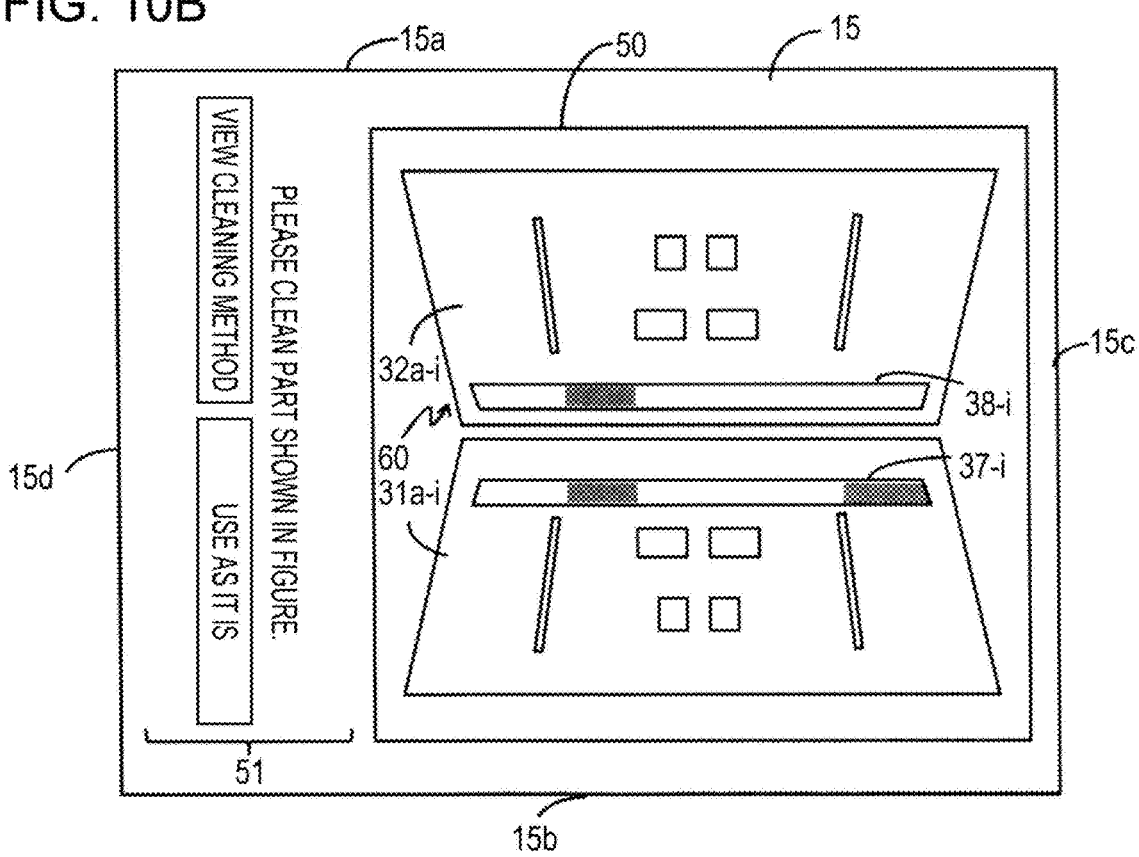
FIG. 10B is a diagram showing a display of a display section that corresponds to a left position use mode.

FIGS. 10A and 10B respectively show display examples in the display section 15 when the reading device 10 is in the second posture. Specifically, FIG. 10A is a display example in the display section 15 corresponding to a right position use mode in which the user stands on the right side of the reading device 10 in the second posture and uses the reading device 10. On the other hand, FIG. 10B is a display example in the display section 15 corresponding to a left position use mode in which the user stands on the left side of the reading device 10 in the second posture and uses the reading device 10. The user sets in advance in the reading device 10 which mode of the right position use mode and the left position use mode is to be used when the reading device 10 is in the second posture. When the reading device 10 becomes the second posture, the control section 11 sets an orientation of the second display region 51 in the display section 15 to an orientation corresponding to the right position use mode or the left position use mode according to such setting.

When the reading device 10 changes from the first posture to the second posture and the right position use mode is set, in step S140, the control section 11 rotates the orientation of the second display region 51 so that the left side 15d of the display section 15 is above the top and bottom of the character string, and the right side 15c is below the top and bottom of the character string. Such a character string in the second display region 51 of FIG. 10A is easy to read by the user standing on the right side of the reading device 10.

When the reading device 10 changes from the first posture to the second posture and the left position use mode is set, in step S140, the control section 11 rotates the orientation of the second display region 51 so that the right side 15c of the display section 15 is above the top and bottom of the character string, and the left side 15d is below the top and bottom of the character string. Such a character string in the second display region 51 of FIG. 10B is easy to read by the user standing on the left side of the reading device 10.

All of the orientations of the second display region 51 in the display section 15 of FIGS. 5 to 7 are corresponding to the first posture. That is, the control section 11 rotates the orientation of the second display region 51 so that the upstream side 15a of the display section 15 is above the top and bottom of the character string, and the downstream side 15b is below the top and bottom of the character string in step S140 when the reading device 10 changes from the second posture to the first posture. Such the character string in the second display region 51 of FIGS. 5 to 7 is easy to read by the user standing in front of the reading device 10.

On the other hand, as can be seen from FIGS. 5 to 7, 10A, and 10B, the control section 11 maintains the orientation of the first display region 50 with respect to the display section 15 so that the upstream side 15a of the display section 15 is above the top and bottom of the device image 60 and the downstream side 15b is below the top and bottom of the device image 60 in step S140 regardless of the posture of the reading device 10. When the first display region 50 is rotated in the display section 15 according to the posture change of the reading device 10, it becomes rather difficult to intuitively understand which position of the glass plates 37, 38 of the actual reading device 10 the position of the alert-expressed stain corresponding region corresponds to. Therefore, the relative orientation of the reading device 10 and the device image 60 displayed on the display section 15 is made unchanged.

3. Summary

Thus, according to the present embodiment, the reading device 10 includes a main body section 31, a cover 32 that can be opened and closed to the main body section 31, a transport path 36 constructed by the main body section 31 and the cover 32, rollers that transport an original document M along the transport path 36, glass plates 37, 38 arranged at a predetermined position on the transport path 36, reading sections 13, 14 that are provided to correspond to the glass plates 37, 38 and perform reading by receiving light through the glass plates 37, 38, a display section 15, and a control section 11. The control section 11 performs a stain detection processing for detecting a stain on the glass plates 37, 38 based on reading results by the reading sections 13, 14. The control section 11 displays a device image 60 in which a stain corresponding region corresponding to a stain position of the glass plates 37, 38 detected in the stain detection processing in glass plate image regions 37-$i$, 38-$i$ expressing the glass plates 37, 38 is shown in a specific form different from that of a region other than the stain corresponding region in the glass plate image regions 37-$i$, 38-$i$, the device image 60 being an image depicting the reading device 10 in a state where the cover 32 is opened and a configuration including a part of the transport path 36, the roller, and the glass plates 37, 38 is exposed, on the display section 15.

According to the above configuration, the stain corresponding region in the glass plate image regions 37-$i$, 38-$i$ is alert-expressed in the device image 60 displayed on the display section 15. Therefore, the user who visually recognizes the device image 60 can concretely and accurately recognize which part of the glass plates 37, 38 is stained, and can accurately remove the stains of the glass plates 37, 38.

As is clear from the example of FIG. 5, the control section 11 displays a plurality of stain corresponding regions corresponding to a plurality of stain positions in the specific form when stains are detected at a plurality of positions of the glass plates 37, 38 in the stain detection processing.

According to the above configuration, the user can concretely and accurately recognize the positions of the respective stains attached to a plurality of positions of the glass plates 37, 38, and can remove the stains thereof.

Further, according to the present embodiment, the control section 11 performs the stain detection processing in at least a part of when the reading device 10 is powered on, when a reading of the original document M by the reading sections 13, 14 is completed, and when the cover 32 is closed, and displays the device image 60 according to a result of the stain detection processing on the display section 15.

According to the above configuration, stain detection notification processing is performed at each timing considered that there is a high possibility that the stains are attached to the glass plates 37, 38 to some extent.

Further, according to the present embodiment, the control section 11 may collectively display the stain corresponding region and a predetermined region outside the glass plate image regions 37-$i$, 38-$i$ adjacent to the stain corresponding region in the specific form in the device image 60.

According to the above configuration, the alert expression is widely displayed outside the stain corresponding region, so that the user can more easily visually recognize an alert expression.

According to the present embodiment, the control section 11 may display a plurality of division lines for dividing the glass plate image regions 37-$i$, 38-$i$ into a plurality of divided regions in a first direction that intersects with a transport direction by the rollers in the device image 60. Further, the control section 11 specifies a divided region corresponding to the positions of the stains of the glass plates 37, 38 among the plurality of divided regions as the stain corresponding region.

According to the above configuration, the division lines are displayed in the device image 60, so that the user can concretely grasp each region in the glass plate image regions 37-i, 38-i.

Further, as shown in the example of FIG. 7, the division lines are extended and displayed so as to protrude outside the glass plate image regions 37-i, 38-i, so that the user can concretely grasp the position of each divided region from the positional relation with the surrounding configuration of the glass plate image regions 37-i, 38-i.

According to the present embodiment, the control section 11 displays a first device image 60 according to a result of first stain detection processing on the display section 15, and then performs second stain detection processing when the cover 32 is opened and closed, and displays a second device image 60 in which the position of the stain corresponding region is changed from the first device image 60 on the display section 15 when stain positions of the glass plates 37, 38 detected in the second stain detection processing are different from the positions of the stains of the glass plates 37, 38 detected in the first stain detection processing.

According to the above configuration, even if the glass plates 37, 38 is not cleaned sufficiently by the user who visually recognizes the device image 60 and the stain moves, the position of the stain after the movement can be further alert-expressed in the device image 60 and notified to the user.

According to the present embodiment, a posture of a housing including the main body section 31 and the cover 32 can be changed to a plurality of postures. The control section 11 displays a first display region 50 including the device image 60 and a second display region 51 including a character string, which is different from the first display region 50 on the display section 15. The control section 11 maintains a direction of the first display region 50 with respect to the display section 15 regardless of a change of the posture, and changes a direction of the second display region 51 with respect to the display section 15 according to the change of the posture.

According to the above configuration, since the direction of the second display region 51 with respect to the display section 15 is changed according to the change of the posture of the reading device 10, a situation in which the characters in the second display region 51 are easily read by the user can be provided whatever posture the posture of the reading device 10 is. Further, the direction of the first display region 50 with respect to the display section 15 is made unchanged regardless of the posture of the reading device 10, so that the user can intuitively understand which position of the glass plates 37, 38 of the actual reading device 10 a position of the alert-expressed stain corresponding region corresponds to.

The present embodiment discloses a method corresponding to the stain detection notification processing, a program 11e for realizing the method in cooperation with hardware, and a memory for storing the program 11e.

That is, the stain display method includes a stain detection step for detecting the stains of the glass plates 37, 38 based on the reading results by the reading sections 13, 14 of the reading device 10, a display step of displaying a device image 60 in which a stain corresponding region corresponding to a stain position of the glass plates 37, 38 detected in the stain detection step in a glass plate image regions 37-i, 38-i expressing the glass plates 37, 38 is indicated in a specific form different from that of a region other than the stain corresponding region in the glass plate image regions 37-i, 38-i, the device image 60 being an image depicting the reading device 10 in a state where the cover 32 is opened and a configuration including a part of the transport path 36, the roller, and the glass plates 37, 38 is exposed, on the predetermined display section 15.

The reading device 10 may be referred to as a display device in that the reading device 10 includes the display section 15 that displays the device image 60. The display device may be a device other than the reading device 10, for example, an external device 20. That is, in the external device 20, the second control section 21 can acquire data of the reading results by the reading sections 13, 14 necessary for the stain detection processing from the reading device 10, perform the stain detection processing, and the second display section 22 can display the device image 60 corresponding to the stain detection processing.

Such the display device includes a stain detection section for detecting the stains of the glass plates 37, 38 based on the reading results by the reading sections 13, 14 of the reading device 10, a display section for displaying the device image 60 in which the stain corresponding region corresponding to the position of the stain on the glass plates 37, 38 detected by the stain detection section in the glass plate image regions 37-i, 38-i expressing the glass plates 37, 38 is indicated in the specific form different from that of a region other than the stain corresponding region in the glass plate image regions 37-i, 38-i, the device image 60 being an image depicting the reading device 10 in a state where the cover 32 is opened and a configuration including a part of the transport path 36, the roller, and the glass plates 37, 38 is exposed.

Further, the external device 20 as the display device may be a device that does not perform the stain detection processing and displays the device image 60 according to the result of the stain detection processing performed by the reading device 10 on the second display section 22. The reading device 10 can also be regarded as a device for displaying the device image 60 on the external device 20 as such a display device. That is, the reading device 10 that is communicatively connected to an external display device includes the main body section 31, the cover 32 that can be opened and closed to the main body section 31, the transport path 36 constructed by the main body section 31 and the cover 32, the rollers that transport the original document M along the transport path 36, the glass plates 37, 38 arranged at a predetermined position on the transport path 36, the reading sections 13, 14 that are provided to correspond to the glass plates 37, 38 and perform reading by receiving light through the glass plates 37, 38, and the control section 11. The control section 11 performs the stain detection processing for detecting the stains of the glass plates based on the reading results by the reading sections 13, 14. The control section 11 displays the device image 60 in which the stain corresponding region corresponding to the position of the stain on the glass plates 37, 38 detected in the stain detection processing in the glass plate image regions 37-i, 38-i expressing the glass plates 37, 38 is indicated in the specific form different from that of a region other than the stain corresponding region in the glass plate image regions 37-i, 38-i, the device image 60 being an image depicting the reading device 10 in a state where the cover 32 is opened and the configuration including a part of the transport path 36, the roller, and the glass plates 37, 38 is exposed, on the display device.

When determining "No" in step S120, the control section 11 may display a device image 60 not including the alert expression on the display section 15 and notify the user that the glass plates 37, 38 are not stained. The device image 60 not including the alert expression is a device image 60 in which none of the glass plate image regions 37-$i$, 38-$i$ are alert-expressed.

The user may freely change the number of divided regions in the glass plate image regions 37-$i$, 38-$i$ and setting of the range of each region by operating an operation reception section 16.

The reading device 10 may be a scanner capable of reading only one side of the original document M, not a scanner capable of reading both sides of the original document M. In that case, the reading device 10 has, for example, only the first reading section 13 out of the first reading section 13 and the second reading section 14, and has only the first glass plate 37 out of the first glass plate 37 and the second glass plate 38.

What is claimed is:

1. A reading device comprising:
   a main body section;
   a cover configured to be opened and closed with respect to the main body section;
   a transport path constructed by the main body section and the cover;
   a roller that transports an original document along the transport path;
   a glass plate arranged at a predetermined position on the transport path;
   a reading section that is provided to correspond to the glass plate and performs reading by receiving light through the glass plate;
   a display section; and
   a control section, wherein
   the control section
   performs stain detection processing for detecting a stain on the glass plate based on a reading result by the reading section,
   depicts a device image in which a stain corresponding region corresponding to a position of the stain on the glass plate detected in the stain detection processing is specified in a glass plate image region expressing the glass plate and the specified stain corresponding region is indicated in a specific form different from a form of a region other than the stain corresponding region in the glass plate image region, the device image being an image depicting the reading device in a state where the cover is opened and a configuration including a part of the transport path, the roller, and the glass plate is exposed, and causes the display section to display the device image,
   wherein, when stains are detected at a plurality of positions of the glass plate in the stain detection processing, the control section indicates, in the specific form, a plurality of stain corresponding regions corresponding to a plurality of positions of the stains.

2. The reading device according to claim 1, wherein in at least a part of when the reading device is powered on, when reading of the original document by the reading section is completed, and when the cover is closed, the control section performs the stain detection processing and causes the display section to display the device image according to a result of the stain detection processing.

3. The reading device according to claim 1, wherein the control section collectively indicates, in the specific form, the stain corresponding region and a predetermined region outside the glass plate image region, the predetermined region being adjacent to the stain corresponding region in the device image.

4. The reading device according to claim 1, wherein the control section causes a plurality of division lines to be displayed in the device image, the plurality of division lines dividing the glass plate image region into a plurality of divided regions in a first direction intersecting a transport direction of the roller, and sets a divided region corresponding to the position of the stain on the glass plate among the plurality of divided regions as the stain corresponding region.

5. The reading device according to claim 1, wherein the control section causes the display section to display a first device image corresponding to a result of first stain detection processing, and then performs second stain detection processing when the cover is opened and closed, and causes the display section to display a second device image in which a position of the stain corresponding region is changed from the first device image when the position of the stain on the glass plate detected in the second stain detection processing is different from the position of the stain on the glass plate detected in the first stain detection processing.

6. The reading device according to claim 1, wherein a posture of a housing including the main body section and the cover can be changed to a plurality of postures, the control section causes the display section to display a first display region that includes the device image and a second display region that includes a character string and is different from the first display region, maintains an orientation of the first display region with respect to the display section regardless of a change of the posture, and changes an orientation of the second display region with respect to the display section according to the change of the posture.

7. A reading device that is communicatively connected to an external display device, comprising:
   a main body section;
   a cover configured to be opened and closed with respect to the main body section;
   a transport path constructed by the main body section and the cover;
   a roller that transports an original document along the transport path;
   a glass plate arranged at a predetermined position on the transport path;
   a reading section that is provided to correspond to the glass plate and performs reading by receiving light through the glass plate; and
   a control section, wherein
   the control section
   performs stain detection processing for detecting a stain on the glass plate based on a reading result by the reading section,
   depicts a device image in which a stain corresponding region corresponding to a position of the stain on the glass plate detected in the stain detection processing is specified in a glass plate image region expressing the glass plate and the specified stain corresponding region is indicated in a specific form different from a form of a region other than the stain corresponding region in the glass plate image region, the device image being an image depicting the reading device in a state where the cover is opened and a configuration including a part of the transport path, the roller, and the glass plate is exposed, and causes the display section to display the device image,
   wherein, when stains are detected at a plurality of positions of the glass plate in the stain detection processing, the control section indicates, in the specific form, a plurality of stain corresponding regions corresponding to a plurality of positions of the stains.

8. A stain display method comprising:

a stain detection step of detecting a stain on a glass plate based on a reading result by a reading section of a reading device including a main body section, a cover configured to be opened and closed with respect to the main body section, a transport path constructed by the main body section and the cover, a roller that transports an original document along the transport path, the glass plate arranged at a predetermined position on the transport path, and the reading section that is provided to correspond to the glass plate and performs reading by receiving light through the glass plate; and a display step of depicting a device image in which a stain corresponding region corresponding to a position of the stain on the glass plate detected in the stain detection step is specified in a glass plate image region expressing the glass plate and the specified stain corresponding region is indicated in a specific form different from a form of a region other than the stain corresponding region in the glass plate image region, the device image being an image depicting the reading device in a state where the cover is opened and a configuration including a part of the transport path, the roller, and the glass plate is exposed, and causing a predetermined display section to display the device image, wherein, when stains are detected at a plurality of positions of the glass plate in the stain detection step, the control section indicates, in the specific form, a plurality of stain corresponding regions corresponding to a plurality of positions of the stains.

9. A display device comprising:

a stain detection section that detects a stain on a glass plate based on a reading result by a reading section of a reading device including a main body section, a cover configured to be opened and closed with respect to the main body section, a transport path constructed by the main body section and the cover, a roller that transports an original document along the transport path, the glass plate arranged at a predetermined position on the transport path, and the reading section that is provided to correspond to the glass plate and performs reading by receiving light through the glass plate; and a display section that depicts a device image in which a stain corresponding region corresponding to a position of the stain on the glass plate detected by the stain detection section is specified in a glass plate image region expressing the glass plate and the specified stain corresponding region is indicated in a specific form different from a form of a region other than the stain corresponding region in the glass plate image region, the device image being an image depicting the reading device in a state where the cover is opened and a configuration including a part of the transport path, the roller, and the glass plate is exposed, and displays the device image, wherein, when stains are detected at a plurality of positions of the glass plate in the stain detection processing, the control section indicates, in the specific form, a plurality of stain corresponding regions corresponding to a plurality of positions of the stains.

* * * * *